(12) United States Patent
Johnson et al.

(10) Patent No.: US 7,394,818 B1
(45) Date of Patent: Jul. 1, 2008

(54) EXTENDED MULTI-LINE HUNT GROUP COMMUNICATION

(75) Inventors: Chris E. Johnson, Broomfield, CO (US); Andrew F. Halperin, Niwot, CO (US); Alejandro Avella, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 1658 days.

(21) Appl. No.: 09/668,652

(22) Filed: Sep. 22, 2000

(51) Int. Cl.
*H04L 12/66* (2006.01)
*H04L 12/54* (2006.01)

(52) U.S. Cl. .................. 370/401; 370/467; 370/352

(58) Field of Classification Search ......... 370/352–356, 370/389, 395.1, 395.52, 395.61, 395.63, 370/401, 412, 465–467, 477; 379/900
See application file for complete search history.

(56) References Cited

U.S. PATENT DOCUMENTS

| | | | |
|---|---|---|---|
| 5,027,641 A | | 7/1991 | Costello |
| 5,175,761 A | | 12/1992 | Khalad |
| 5,388,151 A | | 2/1995 | Khalid |
| 5,394,460 A | | 2/1995 | Olson |
| 5,400,325 A | | 3/1995 | Chatwani |
| 5,521,914 A | | 5/1996 | Mavraganis |
| 5,933,490 A | * | 8/1999 | White et al. ............ 379/221.01 |
| 6,069,890 A | * | 5/2000 | White et al. ................. 370/352 |
| 6,215,858 B1 | * | 4/2001 | Bartholomew et al. ... 379/88.17 |
| 6,259,691 B1 | * | 7/2001 | Naudus ....................... 370/352 |
| 6,275,574 B1 | * | 8/2001 | Oran ....................... 379/201.01 |
| 6,463,051 B1 | * | 10/2002 | Ford ............................ 370/352 |
| 6,512,764 B1 | * | 1/2003 | Carew et al. ................. 370/356 |
| 6,532,235 B1 | * | 3/2003 | Benson et al. ............. 370/395.1 |
| 6,584,108 B1 | * | 6/2003 | Chung et al. ................. 370/401 |
| 7,180,888 B1 | * | 2/2007 | Crouch et al. ............... 370/352 |
| 7,203,186 B1 | * | 4/2007 | Fuller et al. .................. 370/352 |
| 7,239,629 B1 | * | 7/2007 | Olshansky et al. ........... 370/353 |
| 2002/0016926 A1 | * | 2/2002 | Nguyen et al. ............... 713/201 |
| 2003/0095542 A1 | * | 5/2003 | Chang et al. ................. 370/352 |
| 2003/0165231 A1 | * | 9/2003 | Singh et al. ............. 379/265.09 |

* cited by examiner

*Primary Examiner*—Chi Pham
*Assistant Examiner*—Ahmed Elallam
(74) *Attorney, Agent, or Firm*—Brooks Kushman P.C.

(57) ABSTRACT

Audible and signaling information sent through a multi-line hunt group may be transmitted over long distances using packet or IP-enabled communication networks. At least one remote site is connected to the communication network. The remote site includes a switch interconnecting a plurality of subscribers. At least one multi-line hunt group is connected to the switch. The communication system also includes at least one service site connected to the communication network. The service site includes a switch connected to a service platform. At least one multi-line hunt group is connected to the switch. A gateway interfaces each multi-line hunt group and the communication network. Each gateway converts audible information received over communication lines and signaling data received over each signaling line into a data format acceptable by the communication network.

27 Claims, 2 Drawing Sheets

EXTENDED MULTI-LINE HUNT GROUP COMMUNICATION

TECHNICAL FIELD

The present invention relates to multi-line hunt groups for multiple user telecommunication systems.

BACKGROUND ART

Multi-line hunt groups include a set of telecommunication lines organized such that if one line is busy, another line is hunted until a free line is found. The telecommunication "lines" may be separate physical cables, may be separate channels on a single cable such as a T1 line, or may be a combination of physical lines and channels. Typically, at least one line is dedicated to handling out-of-band signaling for the remaining communication lines.

Typically, a multi-line hunt group is supported by a switch. A plurality of users are connected to the switch. The switch receives incoming calls and determines over which communication line of the multi-line hunt group the call will be transmitted. Multi-line hunt groups may be used at any service site supporting multiple resources. Examples include voicemail services, unified messaging, call centers, fax centers, data distribution centers, and the like.

Problems with multi-line hunt groups arise when users are located a great distance away from service sites. Subscribers accessing a remote service may then incur long distance charges. Such charges increase the cost of the service, making the service less attractive to users. One solution is to provide multiple copies of the service site at local locations. However, service equipment is often expensive, again resulting in increased costs to the user. Further, multiple local sites are difficult to maintain and may still require long distance inter-site communication.

What is needed is extended multi-line hunt groups which utilize relatively inexpensive means for long distance communication.

DISCLOSURE OF INVENTION

Cost saving may be achieved by transporting voice traffic and associated signaling over cost insensitive packet communication networks. This permits centrally located service platforms without prohibitive long distance costs to remote users.

A communication system is provided having an IP-enabled communication network. At least one remote site is connected to the communication network. The remote site includes a switch interconnecting a plurality of subscribers. At least one multi-line hunt group is connected to the switch. A gateway interfaces each multi-line hunt group and the communication network. The communication system also includes at least one service site connected to the communication network. The service site includes a switch connected to a service platform. At least one multi-line hunt group is connected to the switch. A gateway interfaces each multi-line hunt group and the communication network.

In embodiments of the present invention, the service platform includes at least one of a voicemail platform, a unified messaging platform, and a computer telephony interface platform.

In other embodiments of the present invention, the communication network carries voice over IP (VoIP), voice over frame relay (VoFR), or voice over ATM (VoATM).

In still another embodiment of the present invention, each gateway includes at least one frame relay access device.

In yet another embodiment of the present invention, each multi-line hunt group includes a plurality of voice communication lines and at least one signaling line carrying signaling data. Each gateway may convert voice received over communication lines and signaling data received over each signaling line into a data format acceptable by the communication network. Further, each gateway may convert line signaling protocols into a format acceptable by the communication network and may pass the converted line signaling protocols to at least one service site. Each gateway may implement a tunneling scheme with a gateway at a different site to exchange signaling data.

In a further embodiment of the present invention, each gateway compresses and decompresses voice information for reduced communication network bandwidth.

In a still further embodiment of the present invention, each gateway performs DS-O mapping to map individual hunt group members across the communication network.

A communication system for transmitting audible messages over an IP-enabled communication network is also provided. The communication system includes a locality of subscriber units. A switch interconnects subscriber units and routes traffic outside of the locality of subscriber units over at least one multi-line hunt group. Each multi-line hunt group includes a plurality of voice communication lines and at least one signaling line carrying signaling data. A gateway in communication with each multi-line hunt group and the communication network converts voice information received over each communication line and signaling data received over each signaling line into a data format acceptable by the communication network.

A method of communicating over an IP-enabled communication network is also provided. Information is received from at least one of a plurality of subscribers. At least one of a plurality of voice communication lines and at least one signaling line in a multi-line hunt group is determined for carrying the received information and associated signaling. Information on each of the voice communication lines and signaling lines is formatted into a format compatible with the communication network. The formatted information is then sent over the communication network. The formatted information may be received and reformatted to convert the information back into the original format for transmission over at least one of a plurality of voice communication lines and at least one signaling line in a multi-line hunt group.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a drawing illustrating a multi-line hunt group voicemail system according to an embodiment of the present invention.

BEST MODE FOR CARRYING OUT THE INVENTION

Figure 1:
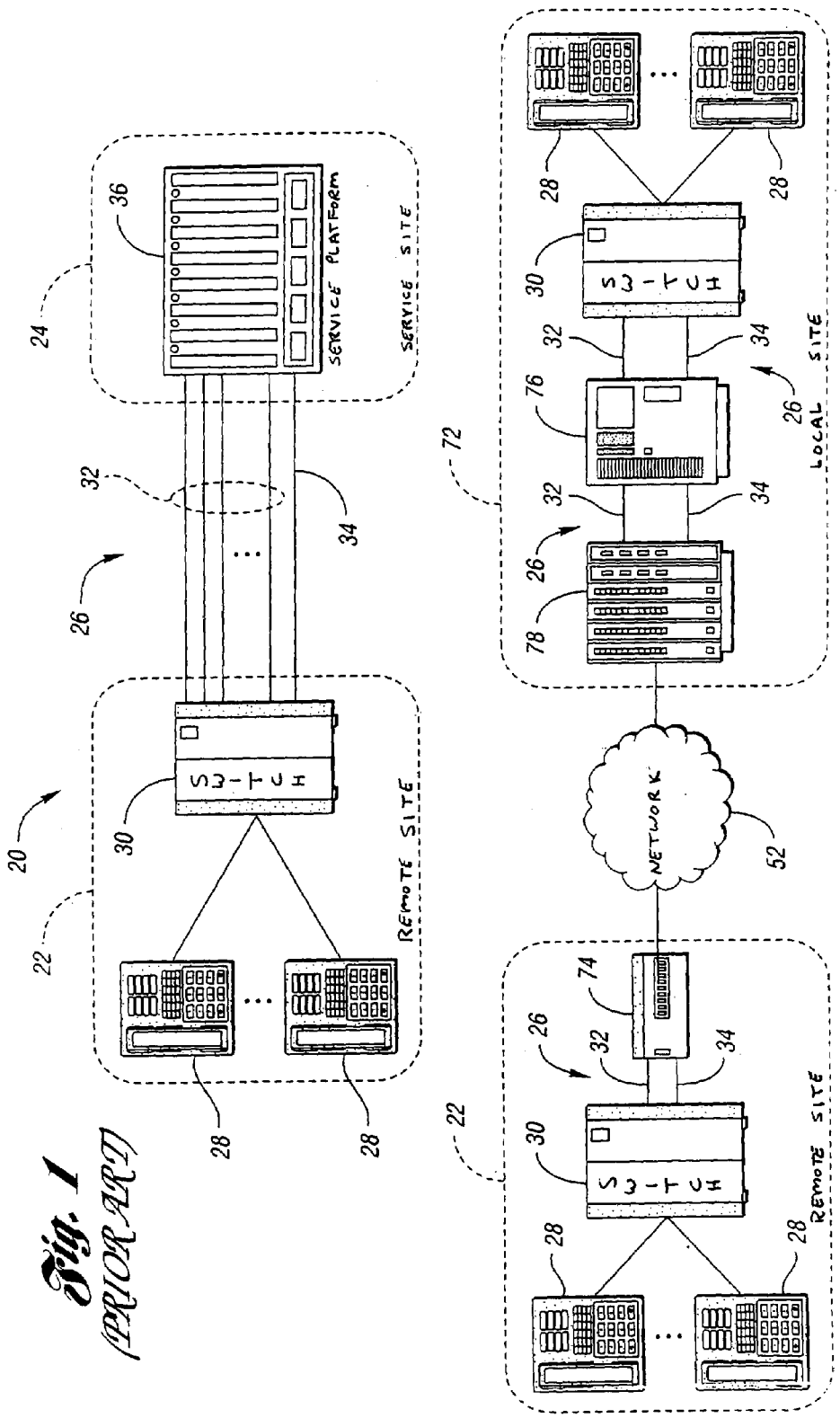
FIG. 1 is a drawing illustrating a prior art multi-line hunt group communication system.

Referring now to FIG. 1, a drawing illustrating a prior art multi-line hunt group communication system is shown. A communication system, shown generally by 20, includes remote site 22 connected to service site 24 by a multi-line hunt group, shown generally by 26. The distance between remote site 22 and service site 24 may be such that additional charges are incurred by transmitting over multi-line hunt group 26.

Remote site 22 includes a plurality of subscribers 28. Subscriber 28 represents a variety of communication devices including telephones, fax machines, computers, video displays, televisions, and the like. Each subscriber 28 is connected to switch 30 which may be located at a central office, business site, or other convenient location. Switch 30 routes calls from subscriber 28 onto an unused line of multi-line hunt group 26.

Multi-line hunt group 26 includes a plurality of communication lines 32 and at least one signaling line 34. Communication lines 32 may be individual physical cables, may be channels on a single cable, or a combination of both. Signaling line 34 carries signaling information associated with voice traffic carried over communication lines 32. Signaling information may include transport of station message desk interface (SMDI) information, such as called number, calling number, message waiting indication, and the like. This information may be transmitted via a separate SMDI link or via the D-channel on a primary rate interface (PRI). Line-side switch functions such as flash-hook and DTMF may be passed via the IP gateway onto the same IP data stream as the voice data and then demultiplexed at a service site 24.

Service site 24 includes service platform 36 providing at least one telecommunication or data service. Such services may include voicemail support, unified messaging, call center support, fax center support, data distribution, and the like. Service platform 36 receives voice information over communication lines 32 and associated signaling information over signaling line 34, processes requests based on the received information and, typically, forwards results over communication lines 32 and signaling line 34.

Figure 2:
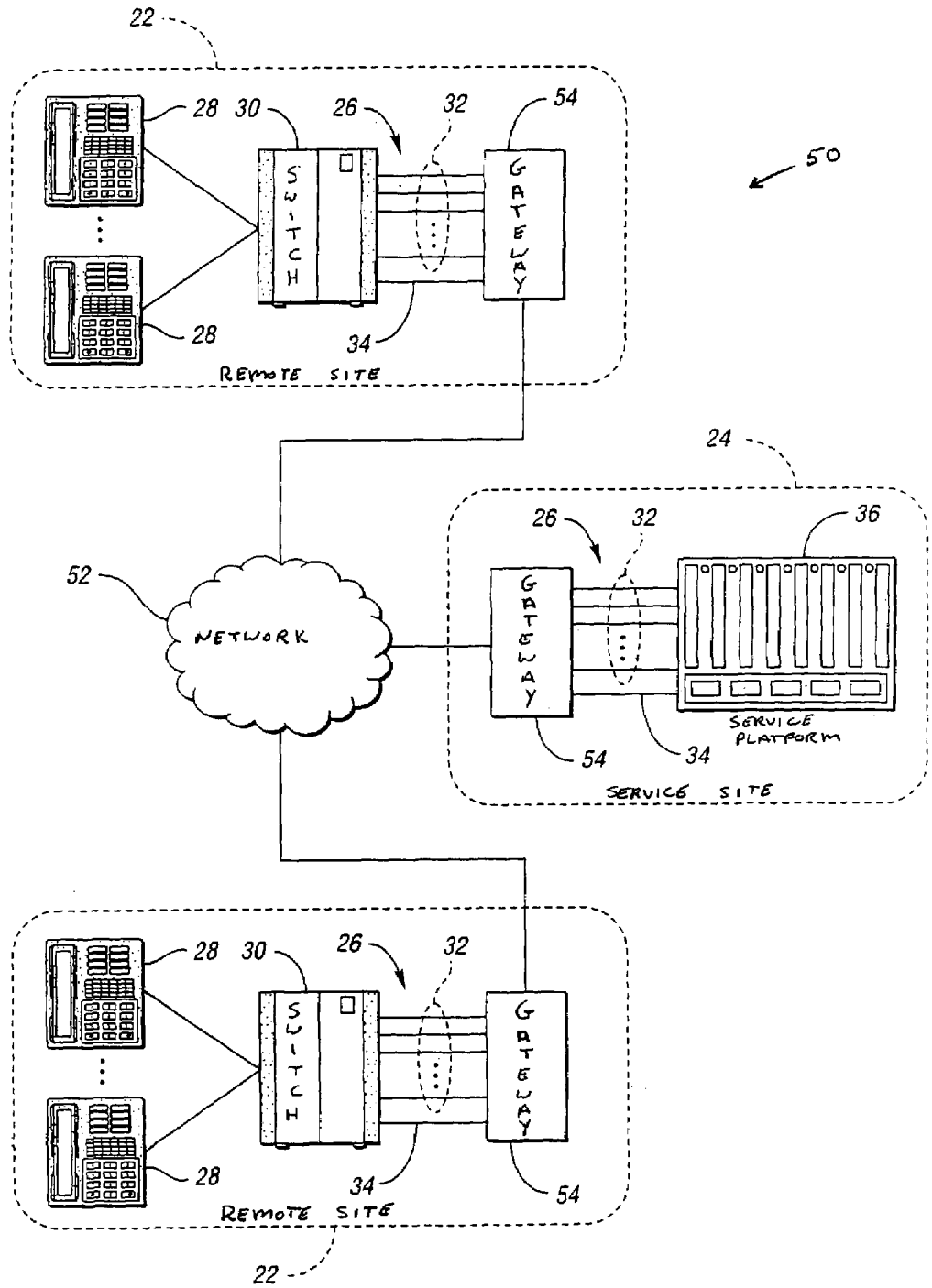
FIG. 2 is a drawing illustrating a multi-line hunt group communication system according to an embodiment of the present invention.

Referring now to FIG. 2, a drawing illustrating a multi-line hunt group communication system according to an embodiment of the present invention is shown. The present invention solves the problem of distance-based cost in long distance multi-line hunt groups by transporting voice traffic and associated signaling links over frame relay directly (VoFR) or as IP traffic on any IP-capable network (VoIP). For generality, any such packet-based network will be referred to as an IP-enabled communication network.

An extended multi-line hunt group communication system, shown generally by 50, includes at least one remote site 22, including a locality of subscribers 28, and at least one service site 24. Remote sites 22 and service sites 24 are interconnected through IP-enabled communication network 52. Each site 22,24 includes gateway 54 interfacing multi-line hunt group 26 with IP-enabled communication network 52. During operation, switch 30 receives information from at least one of subscribers 28. Switch 30 determines at least one of voice communication lines 32 and signaling lines 34 in multi-line hunt group 26 to carry the received information and associated signaling. Gateway 54 formats information on each voice communication line 32 and signaling line 34 into a format compatible with communication network 52 and sends the formatted information over communication network 52. Gateway 54 in service site 24 receives the formatted information over communication network 52. Gateway 54 reformats the converted information back into the original format for transmission over at least one voice communication line 32 and signaling line 34 in multi-line hunt group 26 connected to service platform 36.

Gateway 54 allows both the conversion of voice to a data format, such as IP or frame relay, and the transport of the signaling link. Voice is formatted using voice cards in gateway 54 that convert and compress PSTN voice signals into the appropriate data format for transfer. Gateway 54 maps individual communication lines 32 of hunt group 26 across data transport network 52. For example, if switch 30 in remote site 22 sends a call onto multi-line hunt group 26 on terminal 1, gateway 54 in remote site 22 must receive the analog or digital call, convert it to data, and send it into communication network 52. Gateway 54 in service site 24 must then convert the call back to an analog or digital form and send the call out on terminal 1 to service platform 36. This is typically referred to as DS-O mapping.

Gateway 54 also allows for transport of the signaling link of hunt group 26 via an interface card or spare auxiliary console port. The data side of the gateway must allow information to be passed back and forth between gateways 54 using, for example, a tunneling scheme to establish a high-priority point-to-point connection between gateways 54.

IP-enabled network 52 permits compression schemes to achieve greater communication line efficiency. For example, ten 64 kbps PSTN lines may be sent over one 64 kbps frame relay link. Gateway 54 includes a voice codec which will determine the amount and type of compression used when converting the voice to data.

Referring now to FIG. 3, a drawing illustrating a multi-line hunt group voicemail system according to an embodiment of the present invention is shown. A voicemail system, shown generally by 70, includes at least one remote site 22 and at least one local site 72 interconnected by IP-enabled communication network 52. Remote site 22 includes a plurality of subscribers 28 connected to switch 30. Switch 30 may be, for example, a model 5ESS from Lucent Technologies located in New Jersey. Switch 30 routes calls from subscribers 28 onto multi-line hunt group 26 by selecting at least one communication line 32 to carry voice information and at least one signaling line 34 carrying signaling information such as integration of subscriber 28 into the correct mailbox based on called and calling party information, message waiting indication, menu navigation, and the like. Multi-line hunt group 26 is connected to voice wide area device (VWAD) 74. VWAD 74 formats voice and signaling information for transmittal over IP-enabled communication network 52. VWAD 74 may be a model 3640 from Cisco Systems, Inc. located in San Jose.

Local site 72 may also include subscribers 28 connected to switch 30 capable of accessing voicemail services. Switch 30 in local site 72 is connected to voicemail platform 76 through multi-line hunt group 26. Voicemail platform 76 may be implemented using an Octel Sierra by Lucent Technologies. Voicemail platform 76 services subscribers 28 from remote site 22 interconnected through IP-enabled communication network 52. VWAD 78 in local site 72 receives packets from IP-enabled communication network 52 and reformats the packetized information as voice signals on one or more communication lines 32 and signaling information on one or more signaling lines 34 within multi-line hunt group 26. VWAD 78 may be implemented using a model 3660 from Cisco Systems, Inc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A communication system comprising:
   an IP-enabled communication network;
   at least one remote site connected to the communication network, the remote site comprising:
   (a) a plurality of subscribers,
   (b) a switch interconnecting the plurality of subscribers,
   (c) at least one multi-line hunt group connected to the switch, each multi-line hunt group comprising a plurality of voice communication lines and at least one signaling line carrying signaling data, and
   (d) a gateway receiving the plurality of voice communication lines and the at least one signaling line for each multi-line hunt group, the gateway interfacing each multi-line hunt group and the communication network; and
   at least one service site connected to the communication network, the service site comprising:
   (e) a service platform providing voice services;
   (f) a switch connected to the service platform;
   (g) at least one multi-line hunt group connected to the switch, and
   (h) a gateway interfacing each multi-line hunt group and the communication network.

2. A communication system as in claim 1 wherein the service platform comprises a voicemail platform.

3. A communication system as in claim 1 wherein the service platform comprises a unified messaging platform.

4. A communication system as in claim 1 wherein the communication network carries voice over IP (VoIP).

5. A communication system as in claim 1 wherein the communication network carries voice over frame relay (VoFR).

6. A communication system as in claim 1 wherein the communication network carries voice over ATM (VoATM).

7. A communication system as in claim 1 wherein each gateway converts voice received over communication lines and the signaling data received over each signaling line into a data format acceptable by the communication network.

8. A communication system as in claim 1 wherein each gateway converts line signaling protocols into a format acceptable by the communication network and passes the converted line signaling protocols to at least one service site.

9. A communication system as in claim 1 wherein each gateway implements a tunneling scheme with at least one gateway at a different site to exchange the signaling data.

10. A communication system as in claim 1 wherein each gateway compresses and decompresses voice information for reduced communication network bandwidth.

11. A communication system as in claim 1 wherein each gateway performs DS-O mapping to map individual hunt group members across the communication network.

12. A communication system for transmitting audible messages over an IP-enabled communication network comprising:
    a locality of subscriber units;
    a switch interconnecting the subscriber units, the switch routing traffic outside of the locality of subscriber units over at least one multi-line hunt group, each multi-line hunt group including a plurality of voice communication lines and at least one signaling line carrying signaling data associated with calls through the plurality of voice communication lines; and
    a gateway in communication with each multi-line hunt group and the communication network, the gateway converting voice information received over each communication line and signaling data received over each signaling line into a data format acceptable by the communication network.

13. A communication system as in claim 12 wherein the gateway formats data for voice over IP (VoIP).

14. A communication system as in claim 12 wherein the gateway formats data for voice over frame relay network (VoFR).

15. A communication system as in claim 12 wherein the gateway formats data for voice over ATM (VoATM).

16. A communication system as in claim 12 wherein the gateway implements a tunneling scheme with at least one gateway at a different site to exchange signaling data.

17. A communication system as in claim 12 wherein the gateway compresses and decompresses voice information for reduced communication network bandwidth.

18. A communication system as in claim 12 wherein the gateway performs DS-O mapping to map individual hunt group members across the communication network.

19. A method of communicating over an IP-enabled communication network comprising:
    receiving information from at least one of a plurality of subscribers;
    determining at least one of a plurality of voice communication lines and at least one signaling line in a multi-line hunt group to carry the received information and associated signaling;
    formatting information on each of the voice communication lines and signaling lines into a format compatible with the communication network; and
    sending the formatted information over the communication network.

20. A method of communicating over an IP-enabled communication network as in claim 19 further comprising:
    receiving the formatted information over the communication network;
    reformatting the converted information back into the original format for transmission over at least one of a plurality of voice communication lines and at least one signaling line in a multi-line hunt group; and
    sending the reformatted information over a multi-line hunt group.

21. A method of communicating over an IP-enabled communication network as in claim 19 wherein the reformatted information is sent to a service platform comprising a voicemail platform.

22. A method of communicating over an IP-enabled communication network as in claim 19 wherein the reformatted information is sent to a service platform comprising a unified messaging platform.

23. A method of communicating over an IP-enabled communication network as in claim 19 wherein the communication network carries voice over IP (VoIP).

24. A method of communicating over an IP-enabled communication network as in claim 19 wherein the communication network carries voice over frame relay (VoFR).

25. A method of communicating over an IP-enabled communication network as in claim 19 wherein the communication network carries voice over ATM (VoATM).

26. A communication system comprising:
    an IP-enabled communication network;
    at least one remote site connected to the communication network, the remote site comprising:
    (a) a plurality of subscribers,
    (b) a switch interconnecting the plurality of subscribers,
    (c) at least one multi-line hunt group connected to the switch, each multi-line hunt group comprising a plurality of voice communication lines and at least one signaling line carrying signaling data, and (d) at least one wide area network access device interfacing each multi-line hunt group and the communication network; and at least one service site connected to the communication network, the service site comprising:

(e) a service platform providing voice services;

(f) a switch connected to the service platform;

(g) at least one multi-line hunt group connected to the switch, and (h) at least one wide area network access device interfacing each multi-line hunt group and the communication network.

27. A communication system for transmitting audible messages over an IP-enabled communication network comprising:

a locality of subscriber units;

a switch interconnecting the subscriber units, the switch routing traffic outside of the locality of subscriber units over at least one multi-line hunt group, each multi-line hunt group including a plurality of voice communication lines and at least one signaling line carrying signaling data; and at least one wide area network access device in communication with each multi-line hunt group and the communication network, the wide area network access device converting voice information received over each communication line and signaling data received over each signaling line into a data format acceptable by the communication network.

* * * * *